(12) United States Patent
Pendock et al.

(10) Patent No.: US 12,463,730 B1
(45) Date of Patent: Nov. 4, 2025

(54) WAVELENGTH LOCKING

(71) Applicant: ACACIA TECHNOLOGY, INC., San Jose, CA (US)

(72) Inventors: Graeme Pendock, Carlisle, MA (US); Hongbin Zhang, Holmdel, NJ (US); Christopher Doerr, Middletown, NJ (US); Tom Williams, Sudbury, MA (US)

( * ) Notice: Subject to any disclaimer, the term of this patent is extended or adjusted under 35 U.S.C. 154(b) by 0 days.

(21) Appl. No.: 17/939,857

(22) Filed: Sep. 7, 2022

Related U.S. Application Data

(63) Continuation of application No. 16/456,582, filed on Jun. 28, 2019.

(60) Provisional application No. 62/825,953, filed on Mar. 29, 2019, provisional application No. 62/788,389, filed on Jan. 4, 2019, provisional application No. 62/783,702, filed on Dec. 21, 2018.

(51) Int. Cl.
*H04B 10/58* (2013.01)
*H04B 10/07* (2013.01)
*H04B 10/40* (2013.01)
*H04B 10/50* (2013.01)
*H04B 10/572* (2013.01)

(52) U.S. Cl.
CPC ............ *H04B 10/58* (2013.01); *H04B 10/07* (2013.01); *H04B 10/40* (2013.01); *H04B 10/505* (2013.01); *H04B 10/572* (2013.01)

(58) Field of Classification Search
CPC ........ H04B 10/43; H04B 10/40; H04B 10/58; H04B 10/07; H04B 10/505
See application file for complete search history.

(56) References Cited

U.S. PATENT DOCUMENTS

| | | | | |
|---|---|---|---|---|
| 5,349,461 A | * | 9/1994 | Huynh | H04B 10/2503 370/294 |
| 5,717,510 A | * | 2/1998 | Ishikawa | H04B 10/0795 398/147 |
| 6,532,320 B1 | * | 3/2003 | Kikuchi | H04J 14/02 385/15 |
| 7,522,845 B2 | * | 4/2009 | Lautenschlager | H01S 5/0687 372/32 |
| 7,526,211 B2 | * | 4/2009 | Mcnicol | H04B 10/64 398/67 |
| 7,725,033 B2 | * | 5/2010 | Nakamoto | H04J 14/0221 398/159 |
| 8,041,226 B2 | * | 10/2011 | Kato | H04B 10/40 375/232 |
| 8,335,438 B2 | * | 12/2012 | Kim | H04B 10/6164 398/208 |
| 8,660,437 B1 | * | 2/2014 | Blauvelt | H04B 10/07957 398/136 |
| 8,855,498 B2 | * | 10/2014 | Tanaka | H04B 10/5055 398/159 |
| 9,450,680 B2 | * | 9/2016 | Sakai | H04B 10/63 |
| 9,525,494 B2 | * | 12/2016 | Ogiwara | H04B 10/6164 |
| 9,571,198 B2 | * | 2/2017 | Kan | H04B 10/616 |

(Continued)

OTHER PUBLICATIONS

Medhi, Von Neumann Architecture, 2012 (Year: 2012).*
Profile Inc., Basic Notes Laser Diodes, 2000 (Year: 2000).*

*Primary Examiner* — Jai M Lee
(74) *Attorney, Agent, or Firm* — Patterson + Sheridan, LLP

(57) ABSTRACT

A system, method, an apparatus to change a frequency of a laser of a first transceiver based on a difference of a frequency of a laser of a second transceiver.

18 Claims, 13 Drawing Sheets

(56) References Cited

U.S. PATENT DOCUMENTS

| | | | | |
|---|---|---|---|---|
| 9,998,235 | B2* | 6/2018 | Zhou | H04B 10/697 |
| 10,027,421 | B2* | 7/2018 | Binkai | H04J 14/0256 |
| 10,050,710 | B2* | 8/2018 | Anandakumar | H04B 10/2507 |
| 10,075,256 | B2* | 9/2018 | Magri | H04J 14/0298 |
| 10,181,968 | B2* | 1/2019 | Stone | H04L 25/03057 |
| 10,819,443 | B2* | 10/2020 | Noguchi | H04B 10/07957 |
| 10,979,148 | B1* | 4/2021 | Zhou | H04J 14/06 |
| 2008/0089692 | A1* | 4/2008 | Sorin | H04J 14/02 |
| | | | | 398/135 |
| 2010/0124418 | A1* | 5/2010 | Noble | H04B 10/0779 |
| | | | | 398/9 |
| 2013/0071108 | A1* | 3/2013 | Park | H04B 10/40 |
| | | | | 398/27 |
| 2014/0099110 | A1* | 4/2014 | Oyama | H04J 14/0276 |
| | | | | 398/91 |
| 2015/0023674 | A1* | 1/2015 | Salsi | H04B 10/61 |
| | | | | 398/202 |
| 2018/0019814 | A1* | 1/2018 | Fludger | H04B 10/07951 |
| 2018/0198522 | A1* | 7/2018 | Mochizuki | H04B 10/572 |
| 2019/0312640 | A1* | 10/2019 | Binkai | H04B 10/6164 |
| 2023/0403080 | A1* | 12/2023 | Igarashi | H04L 27/0014 |

* cited by examiner

WAVELENGTH LOCKING

RELATED APPLICATIONS

This application is a Continuation of U.S. patent application Ser. No. 16/456,582 filed Jun. 28, 2019, titled "Wavelength Locking," which claims the benefit of U.S. provisional patent application 62/783,702 filed Dec. 21, 2018, titled "Wavelength Locking," U.S. provisional patent application 62/788,389 filed Jan. 4, 2019, titled "Laser Tuning," and U.S. provisional patent application 62/825,953 filed Mar. 29, 2019, titled "Wavelength Tuning," all of which are incorporated herein by reference in their entirety for all purposes.

BACKGROUND

In an optical communication system, it may be beneficial to have lasers operate at similar frequencies.

SUMMARY

A system, method, an apparatus to change a frequency of a laser of a first transceiver based on a difference of a frequency of a laser of a second transceiver.

BRIEF DESCRIPTION OF THE FIGURES

Various aspects and embodiments of the application will be described with reference to the following example embodiments. It should be appreciated that the figures are not necessarily drawn to scale.

DETAILED DESCRIPTION

Figure 1:
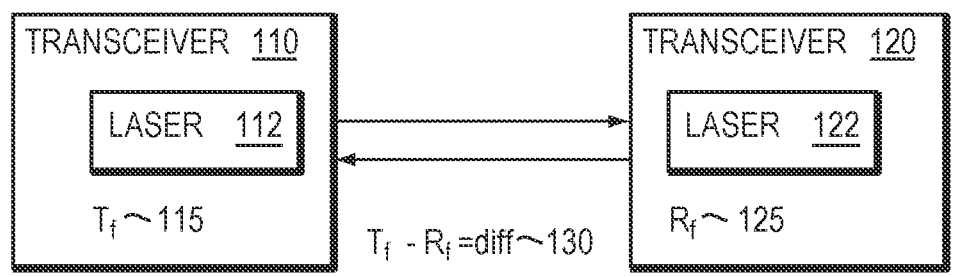
FIG. 1 is a simplified illustration of an optical transmission system illustrating a difference between frequencies of a first and second transceiver, according to an embodiment of the current disclosure.

In many embodiments, an optical communication or transmission system may include a transmitter and a receiver. In most embodiments, a transmission, such as a set of digital bits, may be encoded in a signal at a transmitter. In certain embodiments, bits may be encoded in a wavelength of light. In most embodiments, encoding binary data may involve error correction coding to provide robustness against transmit errors. In certain embodiments, in a coherent optical communication system, it may be beneficial to have the transmitter's laser and local oscillator laser operate at nominally the same frequency. In many embodiments herein, a local oscillator may be used interchangeable with a receive laser. In other embodiments herein, a local oscillator may be used interchangeably with a transmit laser. In many embodiments, a local oscillator may generate a carrier wave that may be used to encode data. In most embodiments herein, the words frequency and wavelength may be used interchangeably.

In certain embodiments, binary data may be converted to symbols with multiple levels. In many embodiments, data may be encoded into two separate streams: an I or 'in-phase' stream and a Q or 'quadrature-phase' stream. In many embodiments, I and Q streams may be viewed as real and imaginary components of complex data. In most embodiments, modulation may involve both amplitude and phase of the transmission carrier with common modulation formats including BPSK, QPSK, 8-QAM, 16-QAM, 32-QAM, 64 QAM, 128 QAM, other 2^N QAM modulations, and other X QAM, where X is the modulation order and may be any integer value. In further embodiments, modulation formats with non-integer modulation orders may be reached by combining different integer based QAM modulations at different ratios.

In many embodiments, I and Q channels may be then modulated onto a transmission carrier and its quadrature phase. In most embodiments, in a coherent optical communication system, a carrier may be an optical output (light) from a laser at the transmitter. In alternative embodiments, a laser may be at different wavelengths of light in each of the alternative embodiments. In certain embodiments, polarization multiplexing may be used. In certain embodiments, polarization multiplexing may refer to data that is transmitted and received on the same wavelength but independently using two states of polarization that are orthogonal.

In most embodiments, an encoded and optically modulated signal may be transmitted over an optical link which typically may be an optical fiber. In some embodiments, an encoded and optically modulated signal may be transmitted through free space. In almost all embodiments, a transmitter may have a laser producing a wavelength of light onto which data is encoded. In most embodiments, a receiver may have a laser that may need to be matched to a frequency of a laser on a transmitter.

In certain embodiments, a receiver may receive a signal from a transmitter and decode the signal into information. In many embodiments, a receiver may use a digital signal processor (DSP) to decode or process a signal. In most embodiments, after transmission a receiver may down-convert a received optical signal to baseband, i.e. the original data, in an electrical domain by mixing it together on a photodiode with a local-oscillator optical carrier of nominally the same frequency from a laser in the receiver. In many embodiments, to extract independent I and Q channels a separate mixing may involve streams using quadrature shifts of both signal and local oscillator. In certain embodiments, if both transmit and receive lasers have identical carriers, i.e. are of the same frequency of light, then the signal may be precisely recovered to baseband or the original signal.

In most embodiments, the current disclosure realizes that, in practice, transmit and received lasers are independent and there may be a frequency offset in the detected spectrum equal to the difference between transmit and received laser frequencies. In many embodiments, it may be a function of a receiver demodulator to remove frequency offset between a transmit laser and a receive laser. In certain embodiments, in a coherent optical communication system, electrical signals received from photo-receivers may be digitized using fast analog to digital converts (ADCs) and the demodulator may use digital signal processing to remove residual frequency and phase offset.

In many embodiments, it may be necessary to tune a laser to a specific wavelength. In most embodiments, a laser may be able to output different wavelengths of light, and the wavelength of any light output may be influenced by temperature and distortion from different components of the laser and or environment. In many embodiments, the current disclosure has realized that lasers between a receiver and transmitter may need frequencies that are well defined and stable over time. Typically, laser subsystems achieve defined and stable frequencies by containing stable filtering elements—known as wavelength lockers—that act as stable accurate frequency references. Conventionally, lasers used in applications that required stable frequencies over time may have included a wavelength locker. Typically, a wavelength locker may have included an etalon or optical interferometer followed by a photodetector. Usually, output light from a laser might pass through an etalon with a free spectral range equal to (or twice of) that of channel spacing for a laser. Generally, an etalon used for wavelength locking needs to be very precise and stable, and the free-spectral range of the etalon response needs to align relatively precisely to the channels in a grid for the system (most etalon-based lockers generally use thermal tuning for some correction).

Conventionally, lasers are mounted on thermoelectric heaters/coolers and control electronics temperature tune the laser to the desired etalon reference. Generally, laser systems use a thermoelectric cooler (TEC) to help tune the laser. Usually, a TEC is controlled using a micro controller connected to optics, where the optics includes a reflector, photodiode, and etalon.

In most embodiments, the current disclosure has recognized that using an etalon and photodetectors may require many discrete parts, where those parts may need to be precisely spaced. Generally, an etalon has multiple pieces of glass including two mirrors with a cavity of precise length. Typically, the spacing of an etalon needs to line up exactly with channels but may have temperature dependence and may have chromatic dispersion. Usually, measurements from an etalon are Lorentzian in shape with respect to wavelength of light passing through the etalon.

Generally, a TEC and etalon enables laser frequency accuracies of typically +/−1.6 GHz such that the difference between transmit and receive lasers is within 3.2 GHz which is within the range of DSP to recover. Usually, this results in the signal being comfortably within the optical receiver pass-band.

In certain embodiments, the current disclosure has realized that using a frequency value obtained by a digital demodulator during frequency recovery may be of limited use since its frequency estimator has unambiguity range only between [−baud/8, baud/8] by 4th power calculation on 1 sample per symbol. In many embodiments, independently locking a laser frequency using an etalon based wavelocker and TEC may be expensive. In many embodiments, the current disclosure has realized that in certain applications cost and size may limit the use of the laser with a wavelocker that includes a microcontroller and optics. In certain embodiments, the current disclosure has further realized that data centers may have been slow to adopt certain type of optical communication systems, in part, because of the cost and size of laser systems. In many embodiments, a cost of wave-lockers for laser frequency stabilization may be significant. In most embodiments, the current disclosure has realized that it may be desirable for a coherent optical communication system to match frequencies of a transmit and receive laser without an etalon based wavelength locker. In many embodiments, the current disclosure has realized that a frequency value obtained by a demodulator during frequency recovery may be of limited use since its frequency estimator has only unambiguity range between [−baud/8, baud/8].

In many embodiments, the current disclosure enables calculation of an offset between transmit and receive lasers. In most embodiments, calculation of an offset may not require transmit and receive laser frequencies to be close enough to for a demodulator to be locked onto a signal or depend on the demodulator functioning as long as the frequency difference is within half of the ADC sampling rate. In certain embodiments, estimation of an offset may be used to temperature tune a receiver local oscillator to closely match a transmitter so a signal is comfortably within the receive bandwidth and the demodulator can function to demodulate the signal.

In many embodiments, the current disclosure may enable a laser to be tuned without the use of additional optics and a microcontroller. In certain embodiments, the current disclosure may use a back-path on a receiver in near end to send information back to a transmitter in far end to tune a transmitter laser. In certain embodiments, the current disclosure may use a feedback loop on a receiver to send information back to a transmitter to tune a transmitter laser. In some embodiments, a receiver may measure a wavelength received from a transmitter and send that information back to a transmitter. In other embodiments, a receiver may send a message to a transmitter denoting how to tune a laser used on the transmitter. In further embodiments, a receiver and transmitter may both track changes in each other's wavelength to tune laser wavelengths.

In some embodiments, a digital signal processor (DSP) on a receiver side may determine a wavelength delta between received light and a local oscillator. In many embodiments, a DSP may send information about a determined difference in wavelength between a local oscillator and received light back to a transmitter on a transceiver to be used to tune a laser on the transmitter on the transceiver. In certain embodiments, a receiver may use two taps, a left tap and a right tap, on a receiver side of the system to determine how far off a received light wave is to a left or a right (wavelength too low or wavelength too high) of what is desired. In most embodiments, a DSP may use information from a left tap and a right tap to calculate the wavelength error between the local oscillator and the received light signal. In certain embodiments, information on how far off a received light wave is from a desired wavelength may be fed back to a transmitter using back-channel communications. In many embodiments, a TEC may be adjusted to tune a laser on a transmitter based on feedback from a receiver. In some embodiments, there may be semiconductor-electrical based methods to make adjustments to tune laser wavelength. In other embodiments, different methods may be used to make adjustments or tune laser wavelength.

In many embodiments, the current disclosure may enable wavelength locking without requiring a frequency of a transmit and receive laser to be close enough for a demodulator to be locked onto the signal or even depend on the demodulator functioning. In most embodiments, estimates in offset may be used to tune a receiver local oscillator to closely match a transmitter so a signal may comfortably be within the receive bandwidth and the demodulator can function. In many embodiments, a receiver as used herein may be part of a transceiver and a receiver laser may also be used as a transmit laser of the same transceiver. In most embodiments, a transmitter as used herein may be part of a transceiver and a transmit laser may also be used as a receive laser of the same transceiver. In many embodiments, a laser used as a transmit laser and a receiver laser on a transceiver may need to be tuned with a laser used as a transmit laser and a receive laser on a second transceiver optically paired with the first transceiver.

In some embodiments, the current disclosure may use two digital band-pass filters at an output of an optical-receiver before the digital demodulator and after an analog to digital converter (ADC). In some embodiments, two band-pass filters may be placed on either side of the spectrum. In these some embodiments, the two filters may ideally have similar characteristics and may be placed symmetrically on either side of the zero frequency. Hence, in these some embodiments, one filter may pass energy predominately from the positive side of the spectrum, whilst the second may pass energy predominately from the negative of a spectrum. In many embodiments, there may be power detectors, with some time averaging, at an output of band-pass filters to provide an estimate of how much signal energy each is picking up.

In some embodiments, a difference between signal levels from band-pass filters at different sides of a spectrum may provide an error signal to estimate the spectrum offset and may be used to tune the frequency of the receiver local oscillator laser. In certain embodiments, error associated with signal offset may be represented with a graph. In some embodiments, when there is no offset the signal is centered, equal amounts of the spectrum may fall on both the upper and lower side-band filters, and the error is zero. In other embodiments, when a laser offset drifts from center an imbalance produces an error signal that may be used to steer the laser back to center. In other embodiments, if a laser offset is so large that spectrum falls outside a receiver bandwidth (initial startup), a receiver laser may do an initial sweep to locate the lock point where an error changes sign.

In many embodiments, there may be many ways to implement two digital band-pass filters. In some embodiments, two band pass-filters may have matching band-shape but may not have a sharp roll-off. In almost all embodiments, a band pass filter may to be able to resolve more energy from one side of a signal spectrum than the other. In some embodiments, band pass filters may be digital filters using data after ADC. In some embodiments, a sample rate and throughput of data from ADCs may be very high but using band pass filters as a monitoring system may work at a much lower rate and off a small fraction of the data and may use averaging windows that may be in the seconds since thermal tuning and drift of lasers is relatively slow.

In certain embodiments, different designs of digital filters may be used. In an embodiment, four consecutive samples from each of the I (I0, I1, I2, I3) and Q (Q0, Q1, Q2, Q3) streams may be periodically chosen. In this embodiment, these four consecutive complex samples may be used to make simple FIR filter with sinc responses centered at +/−fs/4 (half-Nyquist) to measure upper and lower side bands:

$$h(t)\text{USB}=(I0+Q1-I2-Q3)+j\cdot(Q0-I1-Q2+I3)$$

$$h(t)\text{LSB}=(I0-Q1-I2+Q3)+j\cdot(Q0+I1-Q2-I3)$$

In this embodiment, taking a modulus squared of complex outputs from these filters may give the power spectral density and then this can be averaged over time for a stable estimate.

In further embodiments, for a point-point inter data center (DCI) connection, a pair of coherent transponders may lock both lasers together without using an expensive wavelength locker insider the lasers or transceivers. In many embodiments, a coherent DSP in a first transceiver and a coherent DSP in a second transceiver may be able to detect a frequency offset between laser A in the first transceiver and laser B in a second transceiver and adjust local oscillator laser frequencies. In certain embodiments, adjustment of a local oscillator laser into an RX hybrid may affect a transmit laser frequency. In many embodiments, laser frequencies may converge to the same frequency, although laser frequency adjustment may be independent and may not need communication between transceivers. In many embodiments, it may not be possible to have an optical filter between transceivers.

In some embodiments, a large measurement range of a frequency offset may be needed. In certain embodiments, if a signal has a symbol rate as Rb, then digital coherent DSP may unambiguously measure the frequency offset between the local oscillator laser and the transmitter laser within the range of [−Rb/8, Rb/8]. In many embodiments, a 4th power may be applied to an equalizer output to remove the data modulation in order to estimate the frequency of a carrier. In some embodiments, data at an output of an equalizer may have one sample per symbol. In certain embodiments, a signal with 64 GBd symbol rate, a coherent DSP may measure and correct the frequency offset within [−8 GHz, 8 GHz]. In some embodiments, if a laser has no wavelength locker and the frequency offset is outside this range, then a coherent DSP may not be able to lock the received data.

In alternative embodiments, a coherent DSP may have an ADC sampling rate Rs at an oversampling ratio of 1.X or 2 of the symbol rate, where an ADC may measure a signal spectrum within [−Rs/2, Rs/2]. In some embodiments, an ADC may record a sample sequence to later calculate a spectrum with a range of [−48 GHz, 48 GHz] for 96GS/s rate. In many embodiments, a coherent DSP may have an ADC buffer with a variable memory size, e.g. 64K samples. In some embodiments, raw ADC data may be fetched and sent into an external microprocessor to calculate a signal spectrum and then estimate the frequency offset. In certain embodiments, extra ASIC operations may not be required. In many embodiments, a simple 64-point fast Fourier transform (FFT) calculation for ADC samples may generate a coarse optical spectrum within [−Rs/2, Rs/2]

In some embodiments, a frequency offset between a local oscillator laser and a transmitter laser may be estimated by $$\text{frequency offset} = a\left(\log_{10}\sum\nolimits_{k=1}^{N/2}|X(k)|^2 - \log_{10}\sum\nolimits_{k=N/2+1}^{N}|X(k)|^2\right)$$

where X(k), k=1, 2, . . . N is the FFT of ADC samples. In some embodiments, a constant coefficient may be calibrated.

In some embodiments, a sensitivity of an offset estimate may be reduced at small frequency offset since the optical spectrum is more symmetric around DC frequency. In certain embodiments, it may be required to give correct estimate when a frequency offset is at least larger than Rb/8 in which a DSP cannot estimate the offset yet. In many embodiments, an offset may be smaller than Rb/8, then there may be no need of using a method since a DSP may be able to unambiguously detect and correct the laser offset. In some embodiments, to test the accuracy of a method, 100 measurements may be measured independently at −7.5 GHz laser offset with 96 GS/s ADC rate. In certain embodiments, a signal may have a raised cosine spectrum with roll off factor 1 and the symbol rate is 69 GBd.

In certain embodiments, analog filtering, usually due to analog bandwidth of trans-impedance amplifier (TIA) and ADC, may prevent an aliased signal being leaked into the ADC sampled data. In some embodiments, an aliased signal may affect a frequency estimate when an offset frequency is very large.

Refer now to the example embodiment of FIG. 1, which illustrates a sample communication system. Transceiver 110 has laser 112 which transmits at frequency $T_f$ 115. Transceiver 120 has laser 122 at frequency $R_f$ 125. Transceiver 120 receives communication from Transceiver 110. Drift 130 between lasers $T_f$-$R_f$ corresponds to the frequency drift or difference in frequency between the lasers. In most embodiments, if frequencies between a transmit and receiver laser are different, it may be hard to decode data encoded on a transmitter portion of a transceiver. In many embodiments, the frequency of a transmit or receiver laser may change during operation and may not be constant. In most embodiments, the current disclosure has realized that it would be beneficial to be able to tune transmit and receive lasers frequencies to be the same.

Figure 2:
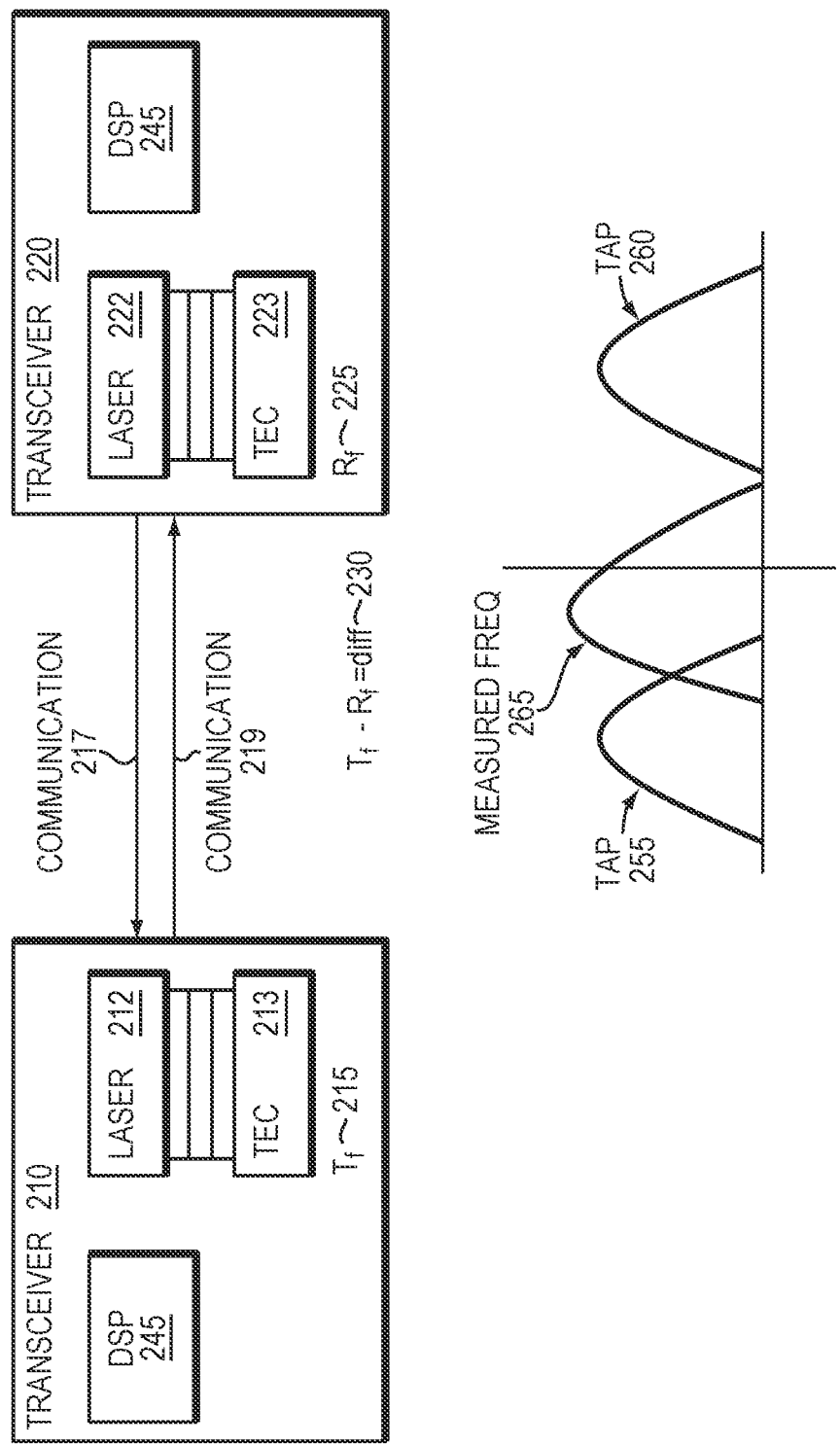
FIG. 2 is an alternative simplified illustration of an optical transmission system illustrating measuring a difference between frequencies of a first and second transceiver, according to an embodiment of the current disclosure.
Figure 3A:
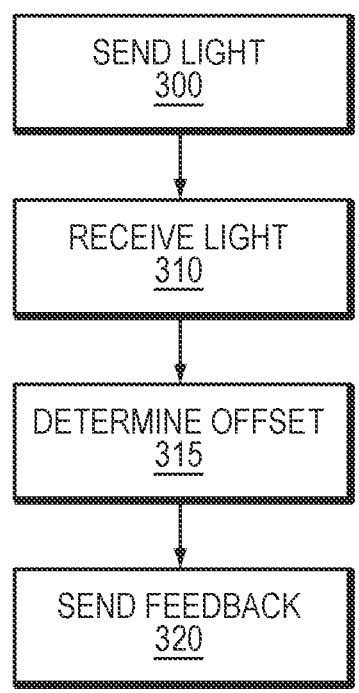
FIG. 3a is a simplified illustration of a method for sending feedback corresponding to a difference in frequencies of lasers of a first and second transceiver, according to an embodiment of the current disclosure.
Figure 3B:
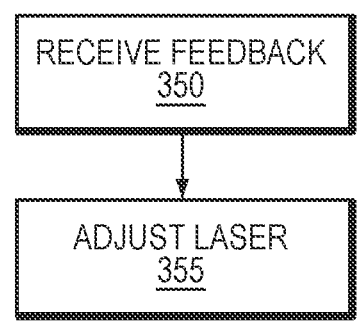
FIG. 3b is an example embodiment of a method for adjusting a frequency of a laser of a transceiver, according to an embodiment of the current disclosure.

Refer now to the example embodiment of FIGS. 2, 3a, and 3b, which illustrates adjusting a laser frequency in a simplified communication system. In these example embodiments, Transceiver 210 has laser 212 at frequency $T_f$ 215 and thermo-electric cooler (TEC) 213. Transceiver 210 sends communication 217 at frequency $T_f$ 215 to Transceiver 220 (step 300). Transceiver 220 receives light from Transceiver 210 (step 310). Transceiver 220 has laser 222 at frequency $R_f$ 225 and TEC 223. Transceiver 220 determines a difference ($T_f$-$R_f$) 230 between the frequency of received light and the frequency $R_f$ 225 of local laser source 222.

Transceiver 220 sends out of band communication in communication 219 back to Transceiver 210 denoting the diff 230 (step 320). Transceiver 210 receives feedback from transceiver 220 (step 350). TEC 213 is adjusted to tune the frequency of laser 212 to match the frequency of laser 222 (step 355). In certain embodiments, a tuning of a laser frequency may be an iterative process. In other embodiments, a tuning process of a laser may be bidirectional with each transceiver performing a calculation and sending information back to a receive side of another other transceiver.

In the example embodiment of FIG. 2, there are two filters, Filter 255 and Filter 260 that are band pass filters. In many embodiments, a band pass filter may inherently be a filter. In certain embodiments, a way to implement filters in a DSP may be a finite impulse response (FIR) filter consisting of weighted multiplier taps. In many embodiments, a FIR filter may be a filter that its response to a defined input (impulse response) has a finite duration, as the filter goes to zero in a given (finite) amount of time.

Referring back to the example embodiment of FIG. 2, the transmitted spectrum from 210 detected by 220 is shown as 265. This shows the spectrum shifted off center to the left since there is a frequency offset between laser 212 and laser 222. The filters 255 and 260 are used to measure how the frequency between transmit and receive laser are offset. In the example embodiment of FIG. 2, energy from received spectrum 265 is detected by filter 255, denoting that the frequency has shifted off a preferred frequency. In FIG. 2, filters 255 and filters 260, are offset on different sides of a spectrum. Filter 260 is shifted to a positive side of the spectrum (the upper side-band) and filter 255 is offset by an equal but opposite amount to a negative side of the spectrum (the lower side-band). In FIG. 2, a difference between signal levels band-pass filters at different sides of a spectrum provides an error signal estimate of the spectrum offset and may be used to temperature tune the receiver local oscillator laser.

Figure 4:
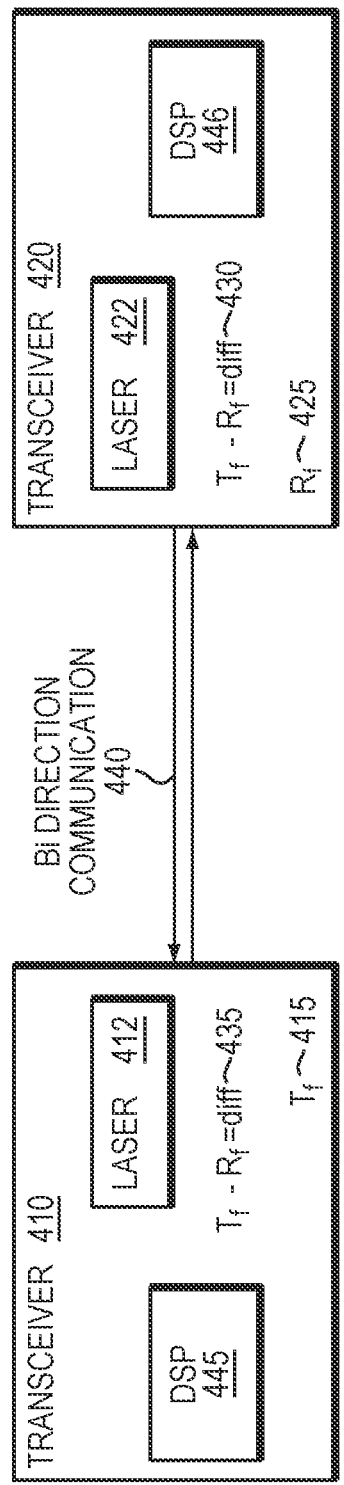
FIG. 4 a simplified illustration of an optical transmission system illustrating a difference between frequencies of a first and second transceiver, according to an embodiment of the current disclosure.
Figure 5:
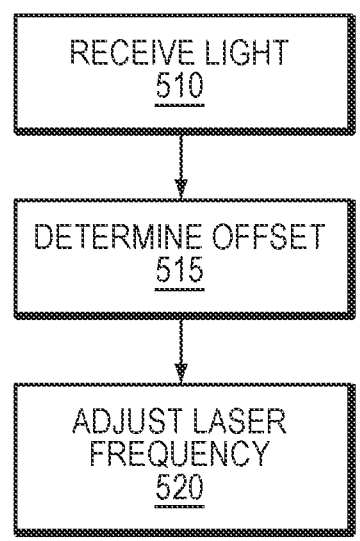
FIG. 5 is a simplified illustration of a method for adjusting a frequency of a laser of a transceiver, according to an embodiment of the current disclosure.

Refer now to the example embodiments of FIGS. 4 and 5, which illustrate example embodiments of updating laser frequencies at a transmitter and a receiver. In these embodiments, Transceiver 410 has laser 412 and DSP 445. Transceiver 420 has laser 422 and DSP 446. Transceiver 410 send communication via a light wave at frequency $T_f$ 415 to Transceiver 420. Transceiver 420 receives the communication from Transceiver 410 (step 510). Transceiver 420 calculates the difference between $T_f$ 415 and $R_f$ 425, the frequency of laser 422 (step 515), and then adjusts the frequency $R_f$ 425 of laser 422 to minimize difference in the frequencies of laser 412 and 422, diff 430 (step 520). Transceiver 420 sends communication via light wave at frequency $R_f$ 425 to Transceiver 410. Transceiver 410 receives the communication from Transceiver 420 (step 510). Transceiver 410 calculates the difference between T 425 and $R_f$ 415 (step 515), the frequency of laser 422, and then adjusts the frequency $R_f$ 415 of laser 412 to minimize difference in the frequencies of laser 412 and 422, diff 435 (step 520).

Figure 6:
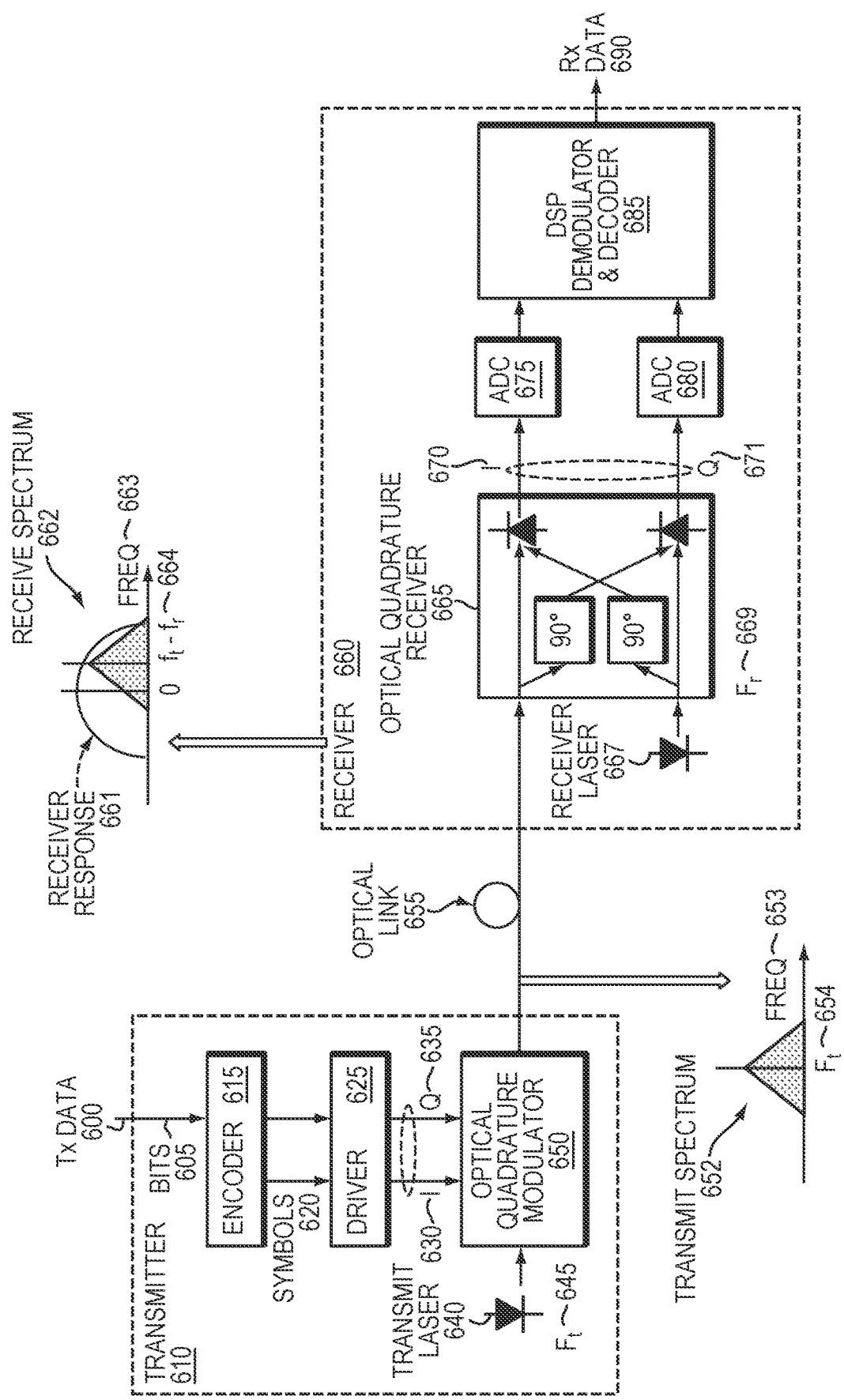
FIG. 6 is an alternative simplified illustration of an optical transmission system illustrating a difference between frequencies of a first and second transceiver, according to an embodiment of the current disclosure.

Refer now to the example embodiment of FIG. 6. Transmitter data 600 is received at transmitter 610 as bits 605. Bits 605 are encoded by encoder 615 into symbols 620 with multiple levels. In certain embodiments, encoding may involve error correction coding to provide robustness against transmit errors. Referring back to FIG. 6, Driver 625 encodes data into two streams, I or 'in-phase' stream 630 and Q or 'quadrature-phase' stream 635. I stream 630 and Q stream 635 can be viewed as the real and imaginary components of the complex data. Optical quadrature modulator 650 modulates I 630 and Q 635 onto a transmission carrier and quadrature phase using transmit laser 640 at frequency

645. In this example embodiment of a coherent optical communication system, the carrier is the optical output from the transmitter laser. The encoded and optically modulated signal from optical quadrature modulator 650 is transmitted over the optical link 665, which is an optical fiber. Transmit spectrum graph 665 shows frequency Ft 654 graphed with respect to frequency 653.

In some embodiments, modulation may involve both amplitude and phase of a transmission carrier with common modulation formats being QPSK, 8-QAM, 16-QAM, etc. In many embodiments, polarization multiplexing may be used, where data may be transmitted and received on the same wavelength but multiple streams independently using two orthogonal states of polarization. In FIG. 6, polarization multiplexing is used but not shown for simplicity.

Referring again to FIG. 6, receiver 660 receives transmission from transmitter 610 across optical link 665. Receiver 660 down-converts the received optical signal from optical link 655 to baseband in the electrical domain by mixing it together on a photodiode in optical quadrature receiver 665 with a local-oscillator optical carrier of nominally the same frequency as laser 640 of transmitter from laser 667 in receiver 660. To extract the two independent I and Q channels as I 670 and Q 671 the separate mixing involving streams using quadrature shifts of both signal (light from laser 640) and local oscillator (light from laser 667).

In this embodiment, if both the transmit and receive lasers, laser 640 and laser 667, have identical carriers, i.e. if frequency $F_t$ 645 is the same as $T_r$ 669, then the signal or information encoded on the light carrier wave would be precisely recovered to baseband, i.e. the information may be extracted from the carrier signal. However, in practice transmit laser 650 and received laser 667 are independent and there will be a frequency offset in the detected spectrum equal to the difference between the transmit and received laser frequencies. Specifically, due to the independence normally transmit laser 640 has frequency $F_t$ 645 and receiver laser 667 has frequency $F_r$ 669 and $F_t$ 645 does not equal $F_r$ 669. In the embodiment of FIG. 6, receiver 660 has demodulator and decoder 685 that removes frequency offset. In FIG. 6, the electrical received signals from the photo-receivers in optical quadrature receiver 665 are digitized using fast analog to digital converts (ADCs 675 and 680) and the demodulator 685 uses digital signal processing to remove residual frequency and phase offset.

In the embodiment of FIG. 6, DSP 685 can recover frequency offset over a range limited by the rate of digital sampling and/or symbol baud-rate (typically 3-7 GHz). As well, in FIG. 6, as the opto-electrical receiver has a finite frequency response (centered at baseband), the larger the offset in the signal or received transmission from transmitter 610 the more it will be distorted or lost preventing reliable recovery. In FIG. 6, there is a single transmitter and a receiver and in other embodiments, a transceiver may be connected to a second transceiver, where each transceiver may have a transmitter and receiver.

Figure 7:
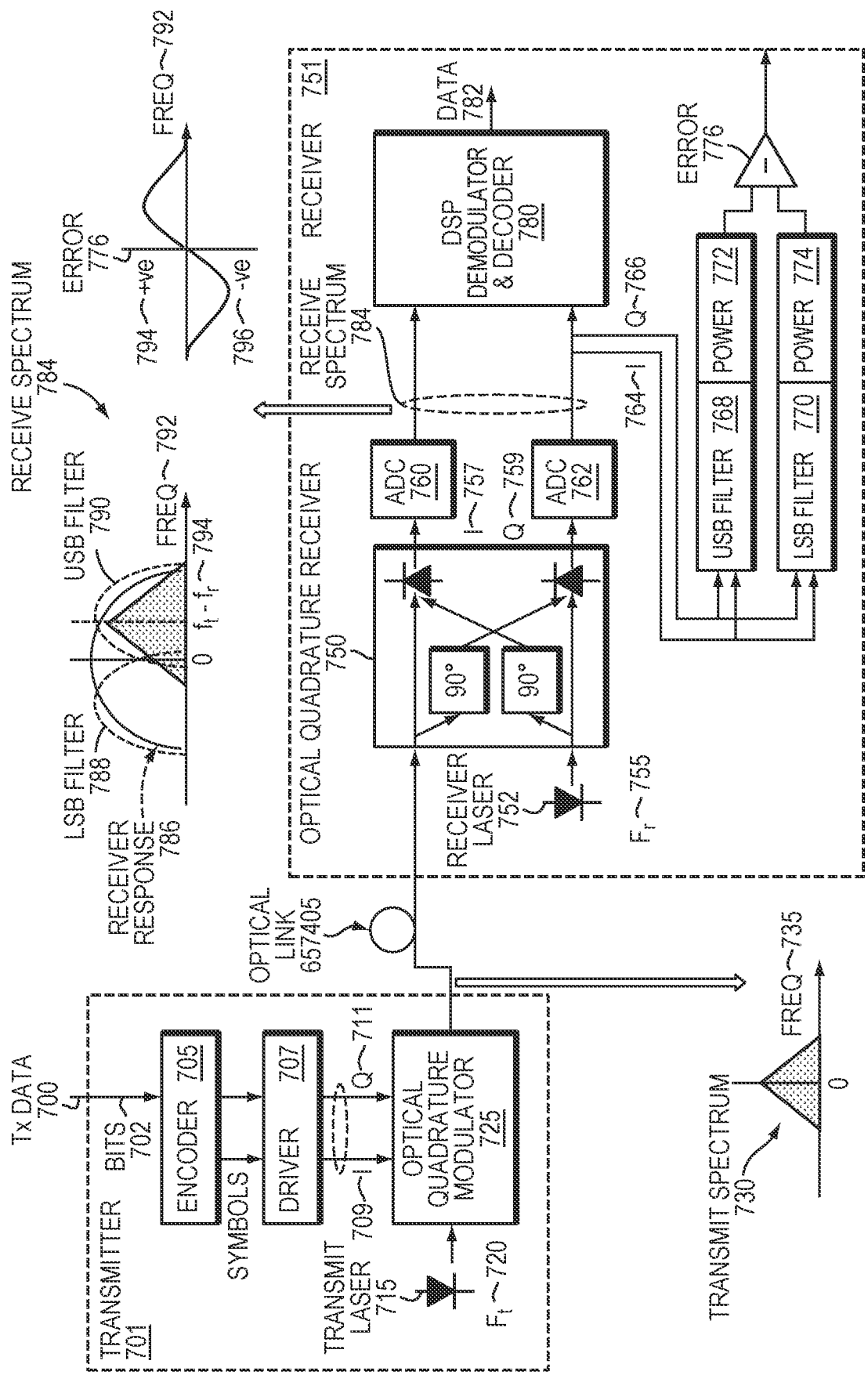
FIG. 7 is a simplified illustration of an optical transmission system illustrating a difference between frequencies of a first and second transceiver using filters, according to an embodiment of the current disclosure.
Figure 8:
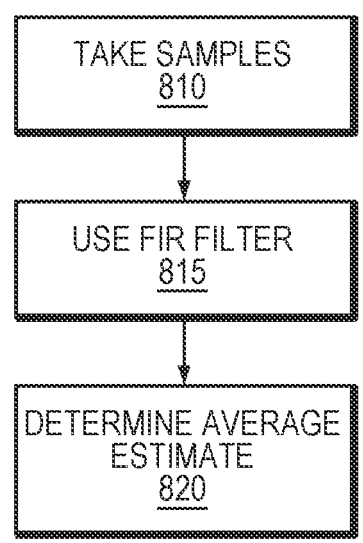
FIG. 8 is an example embodiment of a method for determining a difference between a first laser frequency and a second laser frequency, according to an embodiment of the current disclosure.

Refer now to the example embodiment of FIG. 7. In the example embodiment of FIG. 7, receiver 751 has band-pass filters upper side-band (USB) filter 768 and lower side-band (LSB) filter 770 at the output of optical quadrature receiver 750 and before the demodulator 780. USB filter 768 and LSB filter 770 have similar characteristic however USB filter 768 is offset to a positive side of a spectrum (the upper side-band) and LSB filter 770 is offset by an equal but opposite amount to the negative side of the spectrum (the lower side-band). Power detectors 768 and 770, with time averaging, are at the output of USB filter 768 and LSB filter 770 to provide an estimate of how much signal energy each is picking up. The difference in these two signal levels measured by USB filter 768 and LSB filter 770 provide error signal estimate 776 of a spectrum offset and can be used to temperature tune frequency $F_t$ 720 of receiver local oscillator laser 715.

Graph 730 illustrates the transmit spectrum as a function of frequency. In graph 730, the transmit spectrum is centered around 0. Graph 784 receive spectrum illustrates LSB filter 788 and USB filter 790 as well as how the transmit spectrum 730 is received on receiver as $F_t$-$F_r$ 794. Graph 784 shows the expected response in this error signal with frequency offset. If $F_t$ and $F_r$ have no offset, then the signal would be centered and equal amount of the spectrum falls on both the upper and lower side-band filters, and the error is zero. When the laser offset drifts from center, as shown in graph 785, the imbalance produces and error signal that can be used to steer the laser back to center as detected by USB filter 790. In other embodiments, if a laser offset is so large that the spectrum falls outside the receiver bandwidth (initial startup) the receiver laser may do an initial sweep to locate the lock point where the error changes sign.

In FIG. 7, USB filter 768 and LSB filter 770 are digital filters using the data after the ADC 760 and 762. The sample rate and throughput of data from ADCs 760 and 762 are high but the filters work at a lower rate and off a fraction of the data from ADCs 760 and 762 and use averaging windows in the seconds as the thermal tuning and drift of lasers 715 and 755 is relatively slow.

In the embodiment of FIG. 7, four consecutive samples from each of the I (I0, I1, I2, I3) and Q (Q0, Q1, Q2, Q3) streams are periodically sampled. In this embodiment, four consecutive complex samples are made simple FIR filter with sinc responses centered at +/−fs/4 (half-Nyquist) to measure upper and lower side bands: $h(t)_{USB}$=(I0+Q1−I2−Q3)+j·(Q0−I1−Q2+I3) and $h(t)_{LSB}$=(I0−Q1−I2+Q3)+j·(Q0+I1−Q2−I3). In this embodiment, taking the modulus squared of the complex outputs from these filters gives the power spectral density and this is averaged over time for a stable estimate.

Figure 9:
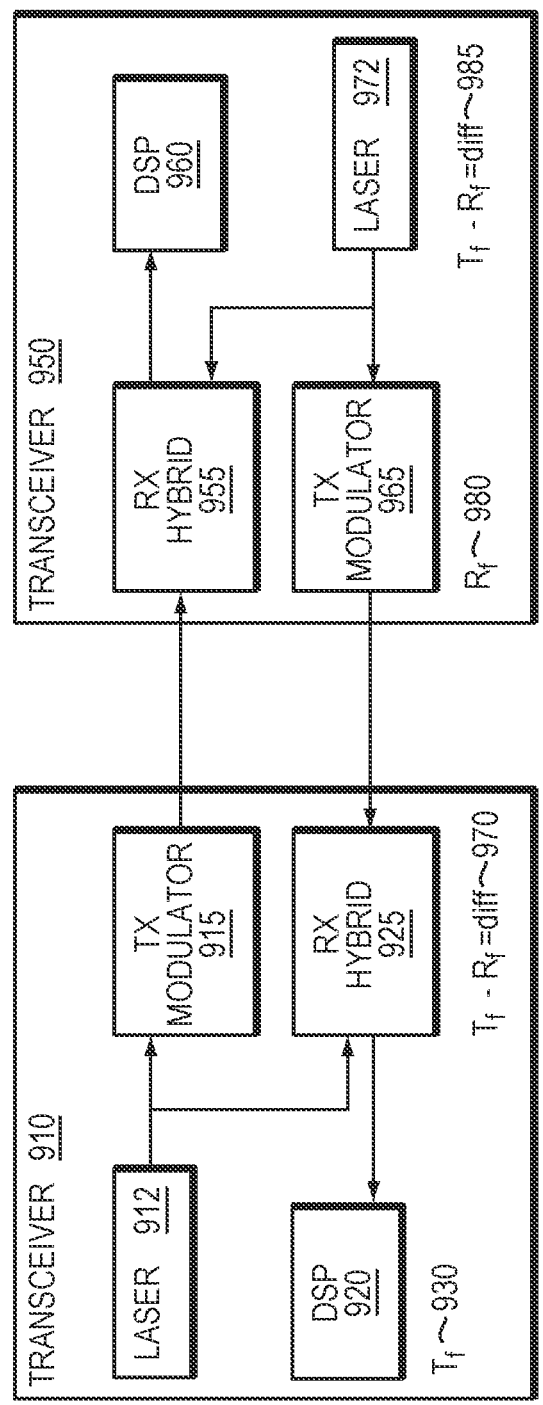
FIG. 9 is a simplified illustration of an optical transmission system, according to an embodiment of the current disclosure.

Refer now to the example embodiment of FIG. 9 and FIG. 5, which illustrates an optical communication system. In FIG. 9, transceiver 910 has laser 912 at frequency $T_f$ 930, transmitter modulator 915, receiver hybrid 925, and DSP 920. Transceiver 950 has receiver hybrid 955, DSP 960, laser 972 at frequency $R_f$ 980, and transmitter modulator 965. In FIG. 9, Laser 912 feeds transmitter modulator 915 which is optically connected to receiver hybrid 955 on transceiver 955. Laser 912 is also used to feed receiver hybrid 925 on transceiver 910 and RX hybrid 925 receives light (step 510). RX hybrid 955 receives light from transmitter modulator 915 (step 510). On transceiver 950, laser 972 inputs into receiver hybrid 955 and drives transmitter modulator 965. DSP 920 is able to detect a difference between Laser 912 and frequency of the laser received from transmitter modulator 965 (step 515). DSP 960 is able to detect a difference between Laser 972 and frequency of the laser received from transmitter modulator 915 (step 515). DSP 920 is able to adjust the frequency of Laser 912 to more closely match the frequency received of the laser received from transceiver 950 (step 520). DSP 960 is able to adjust the frequency of Laser 972 and frequency of the laser received from transmitter module 965 (step 520). In these example embodiments, there is not an optical filter between transceiver 910 and transceiver 950. Iteratively applying the steps of FIG. 5 will affect the laser frequency on both transceivers, but generally, it will be guaranteed that both laser frequencies will converge to the same frequency where the laser frequency adjustment is independent and there is no need of communication between the transceivers.

Figure 10A:
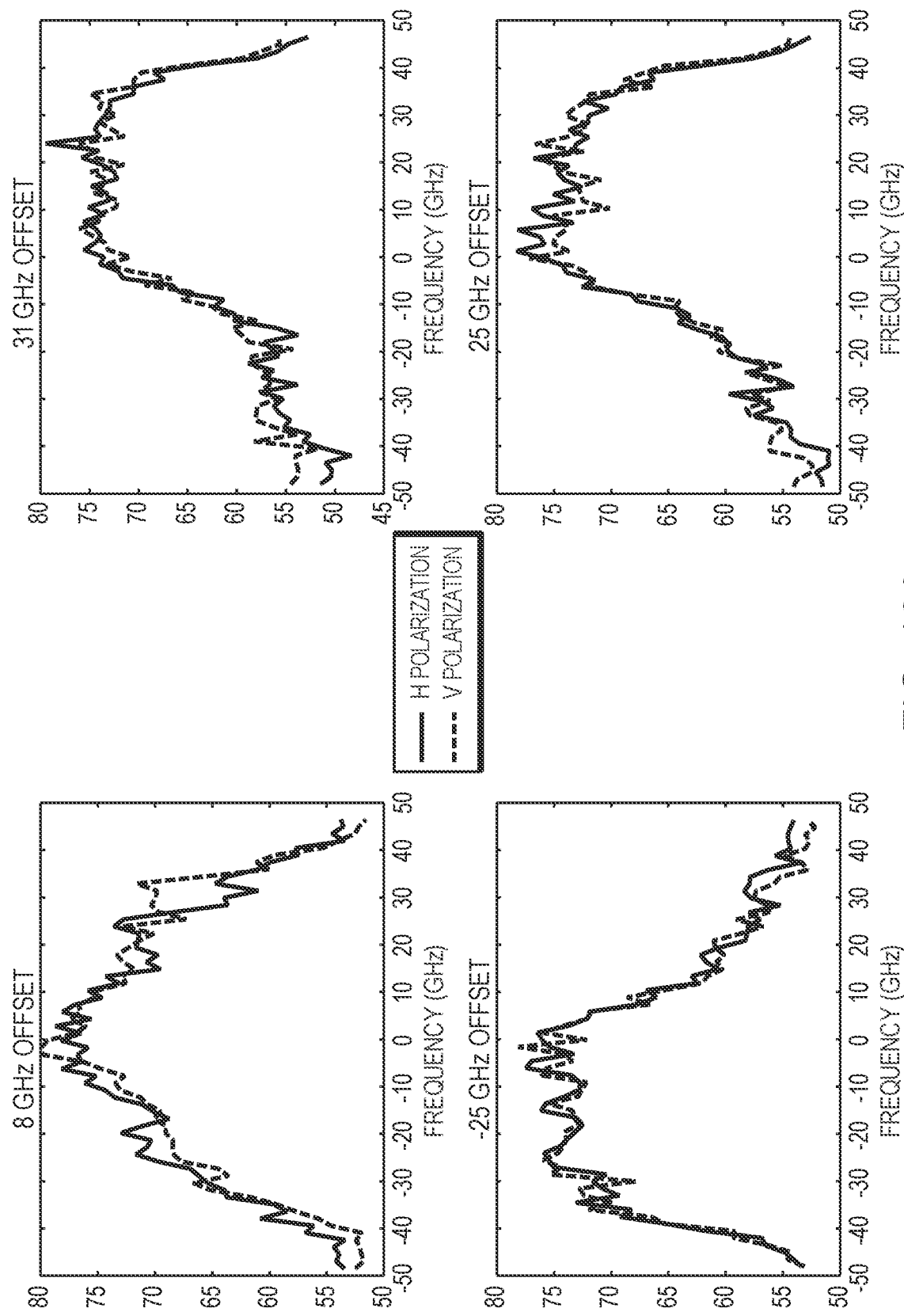
FIGS. 10a and 10b illustrate sample graphs of measured optical spectrum of received signal by 64-point FFT at different offsets, according to an embodiment of the current disclosure.
Figure 10B:
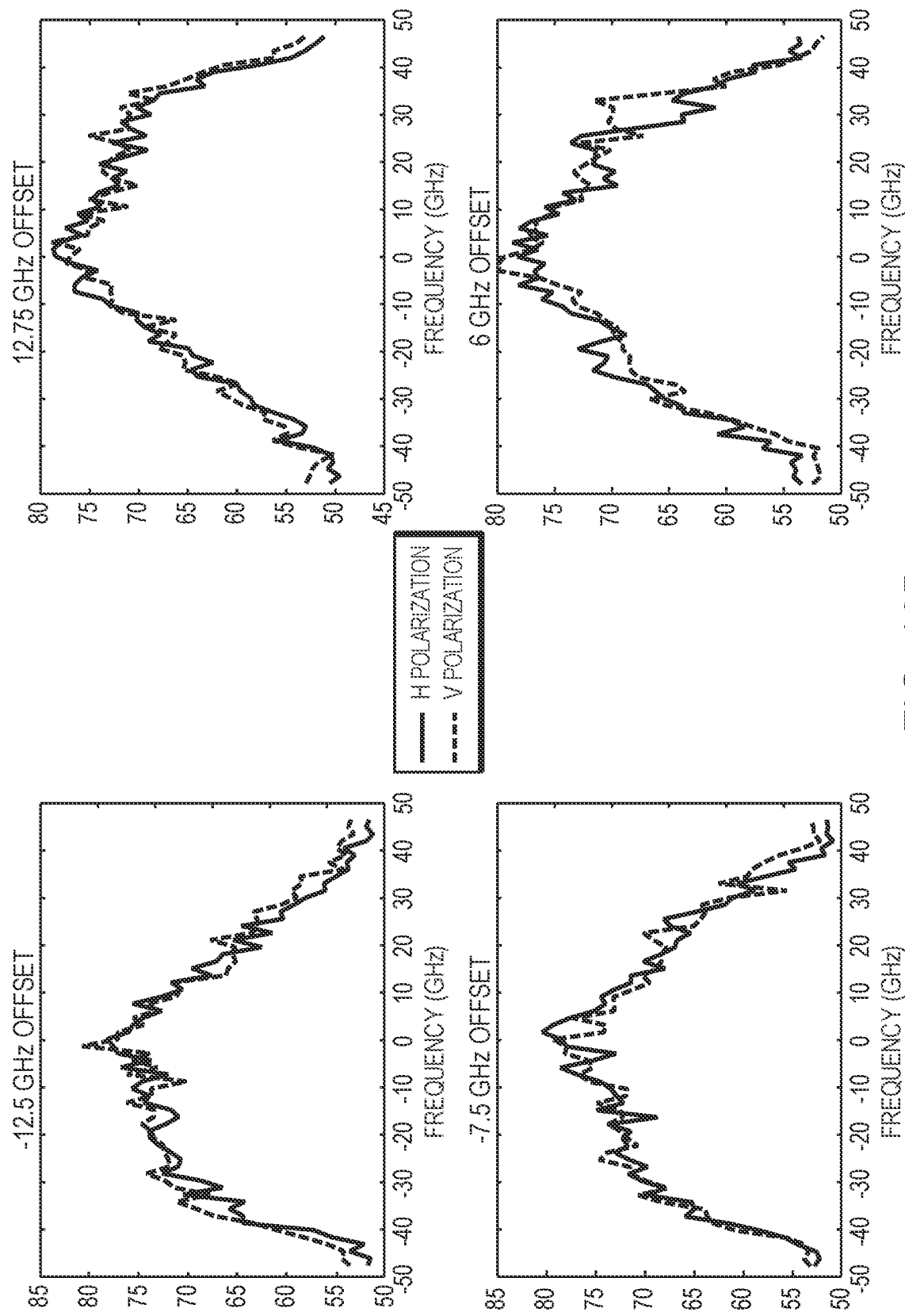

Refer now to the example embodiments of FIGS. 10*a* and 10*b*. FIGS. 10*a* and 10*b* illustrates sample graphs of measured optical spectrum of received signal by 64-point FFT at different offsets. In the example embodiments of FIGS. 10*a* and 10*b*, a simple 64-point fast Fourier transform (FFT) calculation for the ADC samples generates a coarse optical spectrum within [−Rs/2, Rs/2]. In the embodiment of FIG. 2, frequency offset between the local oscillator laser and the transmitter laser can be estimated by $$\text{frequency offset} = a\left(\log_{10}\sum\nolimits_{k=1}^{N/2}|X(k)|^2 - \log_{10}\sum\nolimits_{k=N/2+1}^{N}|X(k)|^2\right)$$

where X(k), k=1, 2, . . . N is the FFT of ADC samples.

Figure 11:
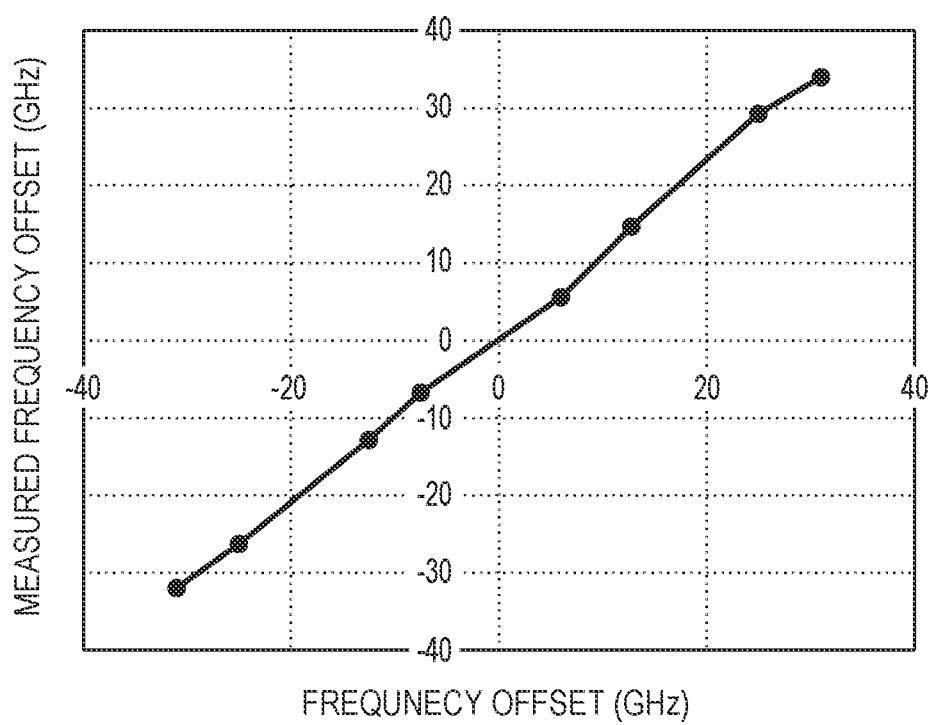
FIG. 11 illustrates an estimated frequency offset vs. setting of a frequency difference between the RX laser and the TX laser, according to an embodiment of the current disclosure.

Refer now to the example embodiment of FIG. 11. The constant coefficient can be calibrated and FIG. 11 illustrates estimated frequency offset vs. the setting of frequency difference between the RX laser and the TX laser.

Figure 12:
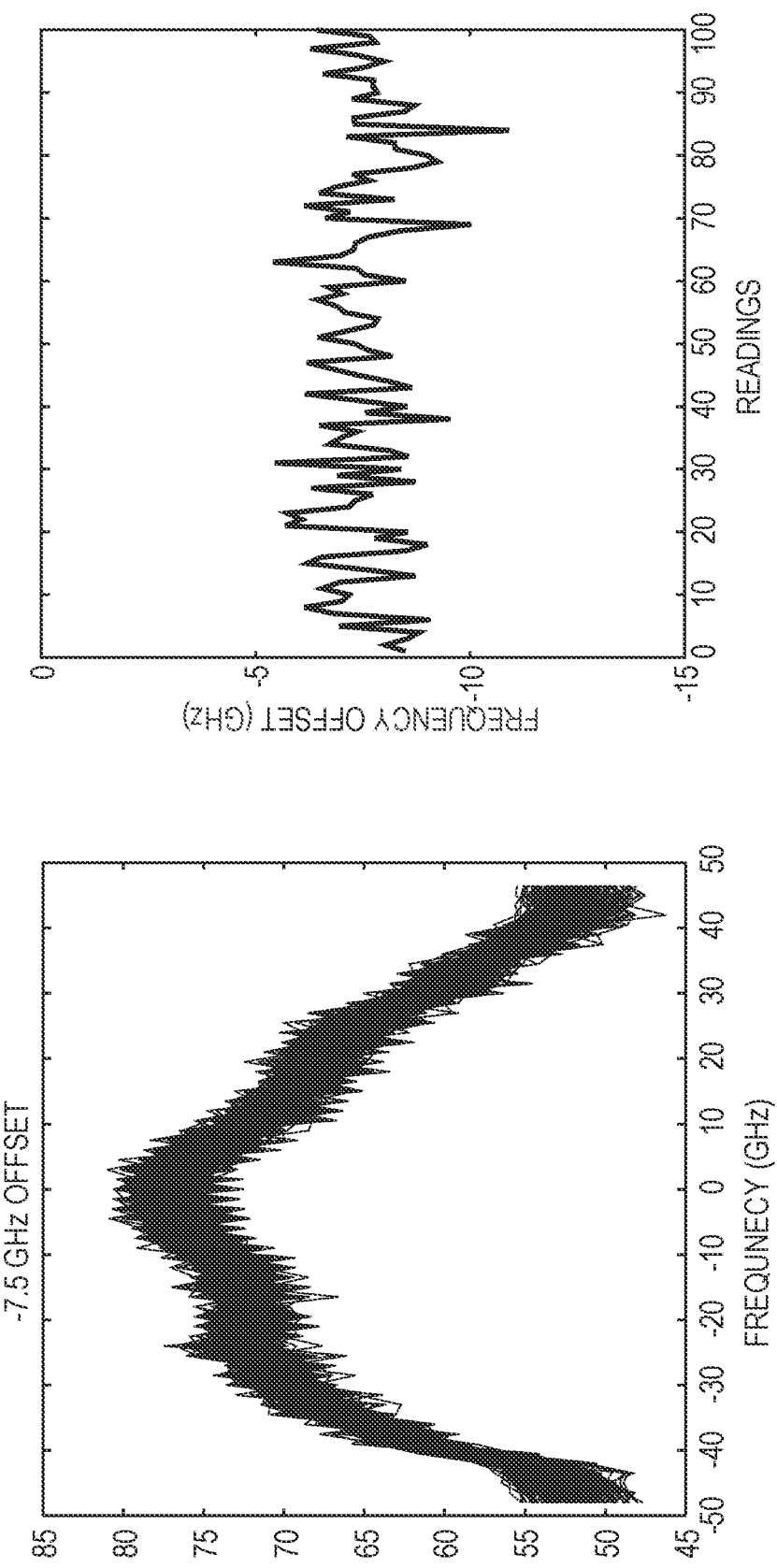
FIG. 12 illustrates 100 measurements of signal spectrum and frequency offset from 96GS/S ADC sampled data by 64-point FFT, according to an embodiment of the current disclosure.

Refer now to the example embodiment of FIG. 12. FIG. 12 illustrates 100 measurements of signal spectrum and frequency offset from 96GS/S ADC sampled data by 64-point FFT. In FIG. 12, 100 measurements were run independently at −7.5 GHz laser offset with 96 GS/s ADC rate. In the example embodiment of FIG. 12, the signal has raised cosine spectrum with roll of factor 1 and the symbol rate is 69 GBd.

In certain embodiments, the current disclosure describes a system, method, an apparatus to measure the difference in frequency between lasers of a first transceiver and a second transceiver and to use this information to adjust the frequency of one or both of the lasers.

In some embodiments, the current disclosure describes a system, method, an apparatus to measure the difference in frequency between transmit and receive lasers using the detected signal in the receiver and then to use this information to adjust either the transmit or receive laser, or both, to reduce the difference in laser frequencies.

In certain embodiments, before transceivers are connected by a fiber, there may be no way for the transceivers to communicate. In many embodiments, there may not be a master transceiver and a slave transceiver. In most embodiments, each transceiver in a pair may need to be treated as an equal. In most embodiments, when transceivers are first connected, each transceiver may need to move towards the other transceiver in wavelength. In some embodiments, as a first transceiver shifts its wavelength to get closer to a second transceiver, the second transceiver will shift its wavelength to get closer to the first transceiver. In most embodiments, as transceivers shift the wavelength of their respective lasers, eventually the transceivers may need to meet and lock on a common wavelength. In certain embodiments, there may need to be a restoring force on tuning of each transceiver. In some embodiments, a restoring force may ensure that wavelengths of a laser of a transceiver does not follow a laser of another transceiver to an end of its tunable range. In many embodiments, a restoring force may be weaker than a tuning force.

In certain embodiments, there may be complications in having two transceivers lock wavelengths of each respective laser to each other. In certain embodiments, a wavelength of each laser may slowly drift together out of tuning range, because there may be no absolute wavelength reference available. In some embodiments, a solution to wavelength drift may be to have each transceiver to move to the center of its tuning range. In many embodiments, if a transceiver moves to the center of its tuning range, each time a correction is made to track to the other laser, the correction may be a smaller correction, in certain embodiments 10 times less, to move to the center of its tuning range. In some embodiments, this may result in two lasers of two transceivers having a small frequency difference, but it may also prevent the two lasers from drifting out of range.

In some embodiments, one or more of the embodiments described herein may be stored on a computer readable medium. In certain embodiments, a computer readable medium may be one or more memories, one or more hard drives, one or more flash drives, one or more compact disk drives, or any other type of computer readable medium. In certain embodiments, one or more of the embodiments described herein may be embodied in a computer program product that may enable a processor to execute the embodiments. In many embodiments, one or more of the embodiments described herein may be executed on at least a portion of a processor.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor DSP. In certain embodiments, one or more of the embodiments herein may be executed on a DSP. One or more of the embodiments herein may be programed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed. In certain embodiments, functionality described herein may be implemented in digital circuitry. In other embodiments, functionally described herein may be implemented in analog circuitry.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, or within ±2% of a target value in some embodiments. The terms "approximately" and "about" may include the target value.

What is claimed is:

1. A method comprising:
   digitally determining, at a first transceiver, a first frequency difference between a first laser of the first transceiver and a second laser of a second transceiver, wherein the first and second transceivers are optically connected; and
   based on the first frequency difference being greater than an offset, changing the frequency of the first laser of the first transceiver and the second laser of the second transceiver using bidirectional tuning between the first transceiver and the second transceiver, to shift the frequency of the first laser toward the frequency of the second laser or to shift the frequency of the second laser toward the frequency of the first laser, wherein the bidirectional tuning comprises:
      transmitting, by the first transceiver, the first frequency difference to the second transceiver;
      receiving, by the second transceiver, the first frequency difference; and
      changing, by the second transceiver, the frequency of the second laser based on the first frequency difference determined at the first transceiver.

2. The method of claim 1 wherein a set of digital filters determines the first frequency difference between the first laser and the second laser.

3. The method of claim 2, further comprising receiving, at the first transceiver, a second frequency difference determined by the second transceiver.

4. The method of claim 3 wherein the second frequency difference is determined at the second transceiver by comparing a received frequency from an optical communication received from the first transceiver to a second frequency of the second laser; wherein the optical communication is driven by the first laser at the first transceiver.

5. The method of claim 4 further comprising:
   determining a third frequency difference between the first laser of the first transceiver and the second laser of the second transceiver at the first transceiver based on the second frequency difference; and
   based on the third frequency difference being not zero, changing the frequency of the first laser on the first transceiver.

6. The method of claim 1, wherein changing the frequency of the second laser shifts the frequency of the second laser toward the center of a tuning range of the second laser of the second transceiver.

7. The method of claim 1, comprising:
   measuring, by the second transceiver, a wavelength of a signal from the first transceiver; and sending, by the second transceiver, the wavelength of the signal to the first transceiver;
   receiving, by the first transceiver, the wavelength of the signal; and
   changing, by the first transceiver, the wavelength of the first laser based on the wavelength of the signal.

8. An apparatus, the apparatus comprising logic stored on a computer readable medium to enable:
   digitally determining, at a first transceiver, a first frequency difference between a first laser of the first transceiver and a second laser of a second transceiver; wherein the first and second transceivers are optically connected; and
   based on the first frequency difference being greater than an offset, changing the frequency of the second laser of the second transceiver using bidirectional tuning between the first transceiver and the second transceiver to shift the frequency of the second laser toward the frequency of the first laser, wherein the bidirectional tuning comprises:
   transmitting, by the first transceiver, the first frequency difference to the second transceiver;
   receiving, by the second transceiver, the first frequency difference; and
   changing, by the second transceiver, the frequency of the second laser based on the first frequency difference determined at the first transceiver.

9. The apparatus of claim 8 wherein a set of digital filters determines the first frequency difference between the first laser and the second laser.

10. The apparatus of claim 9, further comprising receiving, at the first transceiver, a second frequency difference determined by the second transceiver.

11. The apparatus of claim 10 wherein the second frequency difference is determined at the second transceiver by comparing a received frequency from an optical communication received from the first transceiver to a second frequency of the second laser; wherein the optical communication is driven by the first laser at the first transceiver.

12. The apparatus of claim 11 further comprising: determining a third frequency difference between the first laser of the first transceiver and the second laser of the second transceiver at the first transceiver based on the second frequency difference; and
   based on the third frequency difference being not zero, changing the frequency of the first laser on the first transceiver.

13. The apparatus of claim 8, wherein changing the frequency of the second laser shifts the frequency of the second laser toward the center of a tuning range of the second laser of the second transceiver.

14. A system, the system comprising circuitry configured to:
digitally determine, at a first transceiver, a first frequency difference between a first laser of the first transceiver and a second laser of a second transceiver; wherein the first and second transceivers are optically connected; and
based on the first frequency difference being greater than an offset, changing the frequency of the second laser of the second transceiver using bidirectional tuning between the first transceiver and the second transceiver, to shift the frequency of the second laser toward the frequency of the first laser, wherein the bidirectional tuning comprises:
transmitting, by the first transceiver, the first frequency difference to the second transceiver;
receiving, by the second transceiver, the first frequency difference; and
changing, by the second transceiver, the frequency of the second laser based on the first frequency difference determined at the first transceiver.

15. The system of claim 14 wherein a set of digital filters determines the first frequency difference between the first laser and the second laser.

16. The system of claim 15, further comprising receiving, at the first transceiver, a second frequency difference determined by the second transceiver.

17. The system of claim 16 wherein the second frequency difference is determined at the second transceiver by comparing a received frequency from an optical communication received from the first transceiver to a second frequency of the second laser; wherein the optical communication is driven by the first laser at the first transceiver.

18. The system of claim 14 further comprising: determining a third frequency difference between the first laser of the first transceiver and the second laser of the second transceiver at the first transceiver based on the second frequency difference; and
based on the third frequency difference being not zero, changing the frequency of the first laser on the first transceiver.

* * * * *